Patented Jan. 19, 1932

1,841,873

UNITED STATES PATENT OFFICE

ERNST BODMER, OF BASEL, SWITZERLAND, ASSIGNOR TO THE FIRM OF DURAND & HUGUENIN S. A., OF BASEL, SWITZERLAND

PREPARATION OF MORDANT DISAZO-DYESTUFFS

No Drawing. Original application filed July 2, 1926, Serial No. 120,251, and in Germany July 13, 1925.
Divided and this application filed November 30, 1928. Serial No. 320,756.

This application is a division of application Ser. No. 120,251, filed July 2, 1926.

I have found that valuable mordant disazo-dyestuffs can be obtained by subjecting one amino group of paraphenylene diamino sulphonic acid (aromatic para-diamino-sulphonic acid compound of the benzene series) to diazotization and subsequent combination with an aromatic ortho-hydroxycarboxylic acid of the benzene series and consecutively subjecting the second amino group thereof to further diazotization and combination with an aromatic ortho-hydroxycarboxylic acid of the benzene series.

For this purpose I prefer to start from an intermediate product of the benzene series from which paraphenylene diamino sulphonic acid is obtainable and which, at first, contains only one free amino group. This free amino group is diazotized and combined with one molecule of an aromatic ortho-hydroxycarboxylic acid of the benzene series. In the monoazo dyestuff thus obtained the second amino group is formed, for instance by reduction of a nitro group, or the like. Then I diazotize once more and couple with a further molecule of an aromatic ortho-hydroxycarboxylic acid of the benzene series. In this way the same aromatic ortho-hydroxycarboxylic acid can be introduced twice into the dyestuff molecule. But it is also possible to use two different aromatic ortho-hydroxycarboxylic acids of the benzene series (salicylic acid, homologues or derivatives thereof, such as ortho-cresotinic acid, meta-cresotinic acid, paracresotinic acid, beta-resorcylic acid and others).

The process is illustrated by the following examples, parts being by weight.

Example I

The monoazo dyestuff which is produced by a well known manner with 24 parts of the sodium salt of paranitraniline sulphonic acid and 14 parts of salicylic acid is suspended in water and made weakly alkaline. Therein the nitro group is reduced, for instance by adding a solution of bisulphide of sodium ($Na_2S_2$) obtained by dissolving 25 parts of crystallized sodium sulphide and 3.2 parts of sulphur in water, and by moderately heating.

The formed amino body is separated from the yellow solution by acidifying and can be obtained in pure form by dissolving with soda and re-precipitating with hydrochloric acid. 33.7 parts of this body in the form of a fine watery suspension are then mixed, while cooling down, with 30 parts of hydrochloric acid and are diazotized by adding slowly 7 parts of sodium nitrite. The insoluble diazo body is filtered off. A solution of 14 parts of salicylic acid and 14 parts of caustic soda lye of 40% in 100 parts of water is prepared, to which 40 parts of soda powder are added. This mass is cooled down to about 0° C. and the diazo compound in moist state is stirred thereinto. Coupling takes place and the azodyestuff thus formed separates out. The reaction mixture becomes a brown thick paste. When all the diazo compound has disappeared, i. e., when the coupling is finished, the paste is diluted with water and heated up, whereby a brown-red solution is obtained. After filtration the dyestuff is salted out.

The reactions and the products are illustrated by the following formulæ:

The monoazo dyestuff from paranitraniline sulphonic acid and salicylic acid, having the constitution:

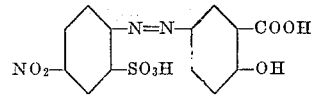

gives by reduction of the nitrogroup para-aminosulpho-benzene azosalicylic acid of the constitution:

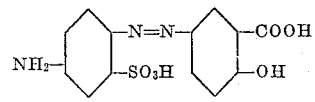

which by diazotization of the free amino group and coupling with salicylic acid yields the dyestuff of the formula

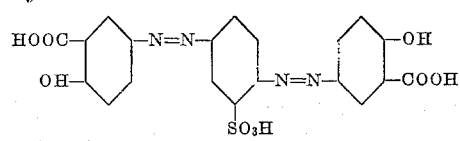

The dyestuff thus obtained dissolves in water giving a yellow solution with a red tone, and by addition of caustic soda lye it turns to red with a blue tone. It dissolves in concentrated sulphuric acid with a violet coloration. If the latter is diluted with water, it precipitates in the form of dark brown flakes.

The new dyestuff dyes chromed wool orange with a brown tone. When printed with a chrome mordant on cotton it gives a strong orange shade with a red tone, a shade which is very fast.

*Example II*

The aminoazo dyestuff such as it is obtained according to Example I, by reducing the nitro group in the azo-dyestuff from par-anitranilinesulphonic acid and salicylic acid is diazotized as described. This diazo compound obtained from 33.7 parts of the aminoazo-dyestuff is stirred into a mixture of 14 parts of salicylic acid, 100 parts of water and 25 parts of magnesium carbonate while cooling.

A thick brown paste results which is diluted with water, acidified and moderately warmed. The insoluble dyestuff is filtered off and washed with diluted muriatic acid for the purpose of eliminating the magnesium salt. The dyestuff is finally dissolved in water and alkali, filtered off and salted out.

The reactions and the products are illustrated by the following formulae:

Para - amino - sulpho - benzeneazosalicylic acid obtained as indicated in Example I and having the constitution

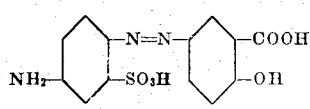

gives by diazotizing the free amino group and coupling with salicylic acid the dyestuff of the constitution:

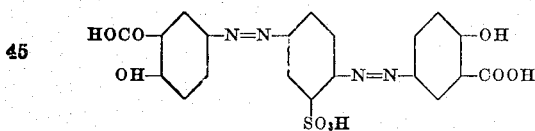

This dyestuff corresponds to the product of Example I.

In these examples salicylic acid can be replaced by the homologues or derivatives thereof such as orthocresotinic acid, metacresotinic acid, paracresotinic acid, betaresorcylic acid and others.

According to the present process dyestuffs containing twice the same or two different aromatic ortho-hydroxy-carboxylic acids of the benzene series can be obtained.

According to the present process the same dyestuffs are obtained as described in my application Ser. No. 120,251, filed July 2, 1926.

What I claim is:

1. The herein described process for the manufacture of new mordant dyestuffs, which consists in starting from an intermediate product of the benzene series from which an aromatic para-diamino-sulphonic acid compound of the benzene series is obtainable and which contains at first only one free amino group, diazotizing this amino group and subsequently coupling with an aromatic ortho-hydroxycarboxylic acid of the benzene series, further forming the second amino group therein, diazotizing this second amino group and also coupling with an aromatic ortho-hydroxycarboxylic acid of the benzene series to obtain disazo dyestuffs having the two azo groups in para-position to each other.

2. The herein described process for the manufacture of new mordant dyestuffs, which consists in diazotizing para-nitraniline sulphonic acid and coupling the diazo compound with an aromatic ortho-hydroxycarboxylic acid of the benzene series, further reducing the nitro group in the body thus obtained to the amino group, thereupon diazotizing also this amino group and coupling with an aromatic ortho-hyroxycarboxlic acid of the benzene series to obtain disazo dyestuffs having the two azo groups in para-position to each other.

3. The herein described process for the manufacture of new mordant dyestuffs, which consists in diazotizing para-nitraniline sulphonic acid and coupling the diazo compound with salicylic acid, further reducing the nitro group in the body thus obtained to the amino group, thereupon diazotizing also this amino group and coupling with salicylic acid to obtain disazo dyestuffs having the two azo groups in para-position to each other.

In witness whereof I have hereunto signed my name this 8th day of November 1928.

ERNST BODMER.